F. WERMES.
ADJUSTABLE TOOL HOLDER.
APPLICATION FILED JULY 10, 1920.
1,373,926.
Patented Apr. 5, 1921.
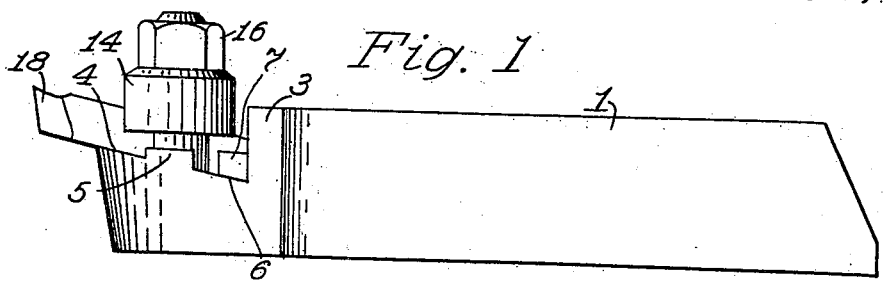
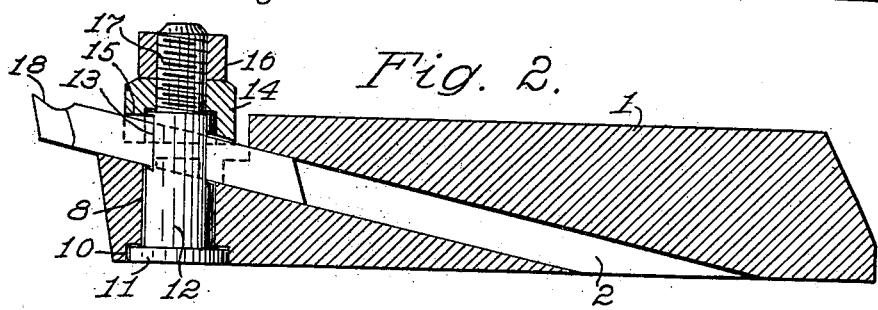
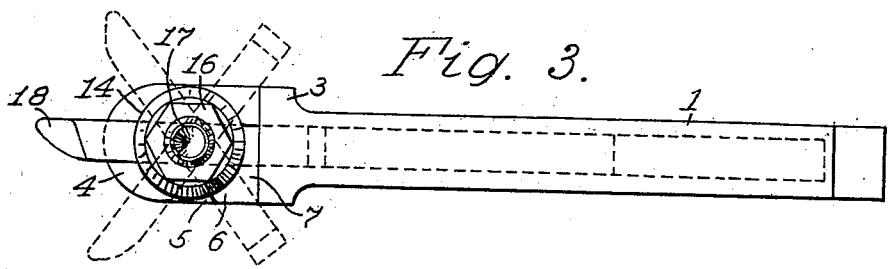
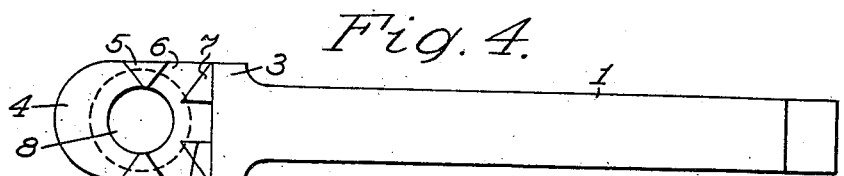
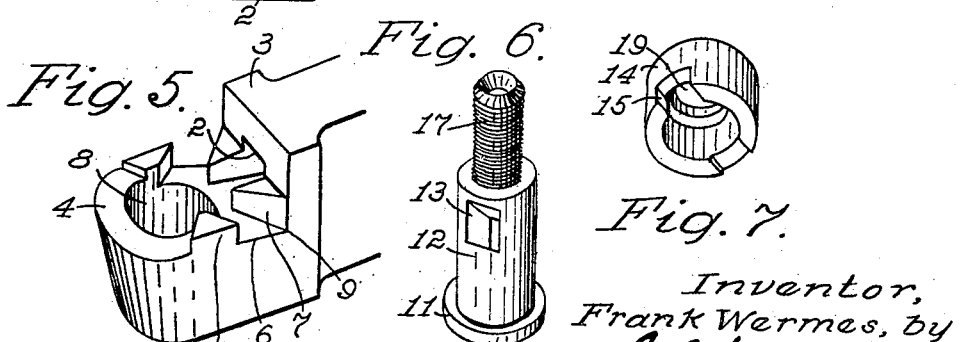
Inventor,
Frank Wermes, by
G. C. Kennedy
Attorney.

UNITED STATES PATENT OFFICE.

FRANK WERMES, OF WATERLOO, IOWA.

ADJUSTABLE TOOL-HOLDER.

1,373,926.　　　　Specification of Letters Patent.　　Patented Apr. 5, 1921.

Application filed July 10, 1920. Serial No. 395,317.

*To all whom it may concern:*

Be it known that I, FRANK WERMES, a citizen of the United States of America, and a resident of Waterloo, Blackhawk county, Iowa, have invented certain new and useful Improvements in Adjustable Tool-Holders, of which the following is a specification.

My invention relates to improvements in adjustable tool-holders, and the object of my improvement is to supply a tool-holder especially designed for strength in use and which has clamping-means mounted removably thereon adapted to hold a tool either longitudinally relative to the holder, or in positions oblique thereto, the holder also having a longitudinal inclined passage or seat for the tool, whereby tools of any desired lengths may be used therein.

This object I have accomplished by the means which are hereinafter shown and described, and which are illustrated in the accompanying drawings, in which Figure 1 is a side elevation of my improved tool-holder with a tool secured therein, and Fig. 2 is a medial longitudinal section of said holder, with the said tool and one of the holding-parts shown in elevation. Fig. 3 is a top plan of said holder and tool, the broken lines showing positions of the tool when adjusted to be positioned obliquely thereto, and Fig. 4 is a top plan view of the shank and bearing-head only of said tool-holder. Fig. 5 is a perspective view of the bearing-head only of said holder. Fig. 6 is a perspective view of the orificed rock-body of said device, and Fig. 7 is a perspective view of the vertically hollowed and transversely grooved clamping-body of the device.

In said drawings, similar numerals of reference denote corresponding parts throughout the several views.

My improved tool-holder is one designed for use with lathes for turning metal, such as steel, and is accordingly of strong and heavy construction to resist the high stresses which it is subjected to.

The elongated shank 1 is shaped suitably to be held in the slide rest, and has a transversely-widened head 3, the upper part of the latter being offset or depressed downwardly at an angle to the shank, preferably less than a right angle, whereby this upper or bearing surface 4 is inclined downwardly and rearwardly and so as to become the forward prolongation of a longitudinal passage 2 which extends through said shank 1 at the same angle slopingly to open at its rear end on the under surface of the shank, whereby a tool 18 may be positioned longitudinally upon said bearing-face 4 to extend into said passage whatever may be the length of the tool.

To releasably clamp said tool upon said bearing-head I have adopted the following described clamping and holding-means which also permit of the tool being mounted and held firmly upon the bearing-head in positions oblique thereto as shown by the broken lines in said Fig. 3.

The bearing-head 3 has a medial vertical cylindrical orifice or hollow seat 8, the lower end of the orifice being widened in diameter, this orifice permitting the filleted lower end 11 of a vertically-disposed tool-holder or rock-body to be held in the widened part 10 of said orifice against the shoulder thus supplied, the body 12 traversing the orifice 8, extending upwardly therethrough to project above the bearing-face 4, the projecting part being orificed from front to rear inclinedly at 13 to seat the tool 18, while said tool rests upon the bearing-face 4 and thus holding the tool with its cutting extremity directed upwardly obliquely, in which position it is most efficient, because of its entering the object operated upon at less than a right angle.

The numeral 14 denotes a clamping-body, and is a hollow cylinder, open at the bottom, whose lower edges are slopingly grooved in alinement from front to rear at 15 to permit it to ride upon and across the tool 18. The closed top of the body 14 is centrally orificed at 19 to receive the diminished and exteriorly-threaded upwardly-directed central projection 17 on the rock-body 12, and a nut 16 is mounted upon said threaded projection to secure the clamping-body 14 over the tool to compress the latter against said bearing-face 4.

The bearing-head 3 has raised triangular integral bosses 5 on opposite sides of the orifice 8, and has also triangular bosses or buttresses 7 on opposite sides of the forward opening of the passage 2, and located in the angle 9 between the bearing-face 4 and the part of the bearing-head 3 extending thereabove. These buttresses 7, as the name implies, support, buttress, and integrally strengthen the bearing-head at said angle 9, the latter being the most liable to fracture under the stresses of heavy work and therefore needing adequate support.

The buttresses 7 and the abutments 5 have their opposed faces parallel and directed obliquely, in spaced relation, across the bearing-face 4 to receive the tool 18 therebetween, when the tool is to be held in either adjusted position shown by the broken lines in said Fig. 3. It will be observed that the clamping-body 14 will secure the rock-body 12 adjustably in either of said positions as well as to hold the tool longitudinally. In all said positions of the tool, it is supported on both sides by the structures fixed in the holder, and in all said positions a tool of any length may be held and used, without any need for first reducing the length of the tool.

Having described my invention, what I claim as new, and desire to secure by Letters Patent, is:

1. A tool-holder, comprising a shank, a bearing-head thereon offset at an angle thereto and having integral triangular transversely-spaced buttresses at said angle, also having a rearwardly and downwardly inclined longitudinal passage leading from the interspace of said buttresses rearwardly through the shank, and means for releasably securing a tool adjustably upon said bearing-head longitudinally in said passage between said buttresses, or adjustably at an angle to said head along inclined faces of the buttresses.

2. A tool-holder, comprising a shank, a bearing-head thereon, offset downwardly at less than a right angle thereto to provide a rearwardly-inclined bearing-face, said head having transversely spaced triangular buttresses at the said angle to reinforce the latter, said shank having a rearwardly and downwardly inclined passage therethrough leading from the interspace of said buttresses with lower wall in the same plane as the said bearing-face of the bearing-head, said bearing-head being vertically orificed, a rock-body adjustably secured in said orifice and having an opening from front to rear adapted to be alined with said inclined passage to receive a removable tool, raised triangular abutments on opposite sides of the vertical orifice on said bearing-head with inclined walls parallel to and spaced from the like inclined walls of said buttresses to provide therebetween seats for said tool oblique to the bearing-head, and releasable adjustable clamping-means mounted on said rock-body to clamp the tool in an adjusted position whether longitudinally or obliquely positioned along said bearing-face.

Signed at Waterloo, Iowa, this 15th day of June, 1920.

FRANK WERMES.